Oct. 20, 1970 J. L. HERRERO 3,535,549
FUNCTION GENERATOR
Filed Feb. 14, 1967 3 Sheets-Sheet 1

INVENTOR
JOSE L. HERRERO
BY Harvey G. Lambert
ATTORNEY

INVENTOR
JOSE L. HERRERO
BY Harvey J. Lowhurst
ATTORNEY

Oct. 20, 1970 J. L. HERRERO 3,535,549

FUNCTION GENERATOR

Filed Feb. 14, 1967 3 Sheets-Sheet 3

INVENTOR
JOSE L. HERRERO
BY
Harvey G. Lambert
ATTORNEY

United States Patent Office 3,535,549

Patented Oct. 20, 1970

3,535,549
FUNCTION GENERATOR

Jose L. Herrero, Mountain View, Calif., assignor, by mesne assignments, to The Singer Company, New York, N.Y., a corporation of New Jersey Filed Feb. 14, 1967, Ser. No. 616,050
Int. Cl. G06g 7/12
U.S. Cl. 307—229 10 Claims

ABSTRACT OF THE DISCLOSURE

A function generator for generating output signals which are a non-linear function of an input signal. Transistor gates are employed to effectively switch resistances into and out of the circuit at selected breaking points. Bias is applied to the gates at other than the real (function) forming portion of the circuitry.

BACKGROUND OF THE INVENTION

Field of the invention

This invention relates in general to function generators, and relates more particularly to such generators for producing an output signal which is a predetermined non-linear function of an input voltage.

Description of the prior art

There are numerous systems available in the prior art for use as function generators. Examples of such systems are tapped servo-driven potentiometers; servo-driven potentiometers where the resistance ratio is a function of shaft angular position; diode function generators which approximate functions by straight line segments; curve and cam servo followers; and cathode-ray tube photoformers. In all of the above systems, the cost and problems of designing a specific function generator are quite high. For example, in the case of the straight line segment diode function generator, at least one diode in the system must change state at every break point in the function. This requires either a separate voltage source to bias each diode or the use of a tapped voltage source, which may produce interference with the biasing of the system. Additionally, such generators produce only output voltages which are a monotonic function of the input voltage unless operational amplifiers are employed to add and subtract component functions for producing non-monotonic functions. Of course, such amplifiers represent an additional cost in the system, and it is desirable to avoid their use if at all possible.

Further, all types of diode function generators have the difficulties that successive slopes of the generated function depend upon previous slopes, that the setting of the break points also affects the slopes, and that the effects of drift voltages accumulate as more diodes are turned on. It is possible to avoid the interaction of slopes discussed above by desgning a generator employing two sources, an operational amplifier, two diodes and a number of resistors to produce each partial segment of the function, so that all slopes not being used become zero. However, the cost of such a generator would be relatively high because of the number of components involved, and it would still have the problem of connecting into the circuit all of the voltages required to properly bias the different diodes.

SUMMARY OF THE INVENTION

In accordance with the present invention, there is provided a function generator which avoids all of the problems of the prior art discussed above and which is more economical than the prior art devices for all but the simplest function. The present invention employs transistor gates, where a transistor is used only as a switch device to maintain a resistor effectively open circuited when the transistor is non-conducting and to effectively shunt the resistor to ground potential when the transistor is saturated. By employing a second transistor to which the bias and input voltages are applied and which controls the transistor connected to the resistance, the bias voltage may be separated from the real (function) forming circuitry. Additionally, by employing a resistor in the emitter lead of this second transistor, the current driven through both transistors in the case of saturation is limited, thus preventing excessive power dissipation in the circuit.

The above-described circuitry provides independent action of each circuit between selected breaking points of the function to be generated, and the total power consumption is improved over the prior art systems. Additionally, the circuitry of the present invention may be utilized to generate any desired monotonic or non-monotonic function, and may also be employed in an inverse manner to linearize a non-linear function if desired.

OBJECTS OF THE PRESENT INVENTION

It is therefore an object of the present invention to provide an improved function generator for generating an output signal which is a predetermined non-linear function of an input voltage.

It is a further object of this invention to provide a function generator employing a first transistor as a switch device to switch a resistance into and out of the function generating circuit and employing a second transistor to control the switching action of the first transistor.

It is an additional object of the present invention to provide a function generator employing a first transistor as a switch device to switch a resistance into and out of the function generating circuit and employing a second transistor to control the first transistor, the bias and input control valtages being applied to the second transistor to isolate them from the function forming circuitry.

It is a further object of this invention to provide a function generator employing a pair of transistors to control the switching of a resistance into and out of the function generating circuit, the transistors being provided with means for limiting the current therethrough upon saturation, to limit the power consumption in the circuitry.

Objects and advantages other than those set forth above will be apparent from the following description when read in connection with the accompanying drawings, in which:

BRIEF DESCRIPTION OF THE DRAWINGS

Referring to FIG. 1, the circuit shown there illustrates the basic principle of the present invention for modifying the output voltage when the input voltage decreases below a predetermined value. The circuit includes a pair of transistors 11 and 12, each having an emitter 11*a*, 12*a*, a base 11*b*, 12*b* and a collector 11*c*, 12*c*. Base 11*b* is connected through a resistive voltage divider, including resistors 13 and 14 and circuit junction 22, to an input terminal 16 representing a source of input voltage. Collector 11*c* is connected to the base 12*b* of transistor 12, and collector 12*c* is connected through a resistor 17 to a terminal 18 at which the output voltage is to appear. A current limiting resistor 19 is connected between emitter 11*a* and a source of bias voltage represented by terminal 21, while emitter 12*a* is connected directly to ground. A resistor 15 is connected between input terminal 16 and output terminal 18.

Figure 1:
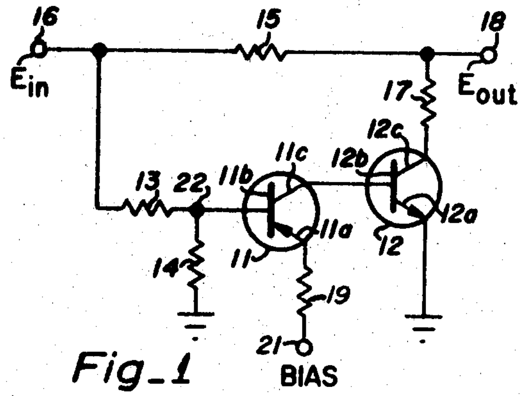
FIG. 1 is a circuit diagram illustrating the principle of the present invention for modifying an output voltage when the input voltage decreases below a predetermined value.

From FIG. 1, it will be seen that when the voltage appearing at junction point 22 in the circuit, which voltage is obtained from the input terminal 16 through the resistive voltage divider comprising resistors 13 and 14, is higher than the biasing voltage at terminal 21, transistor 11 will be non-conducting. This means that transistor 12 will also be non-conducting, so that resistor 17 is effectively open circuited. However, when the voltage at point 22 goes below the value of the bias voltage at terminal 21, transistor 11 will conduct and its collector current wtll trigger transistor 12 into saturation. Saturation of transistor 12 will virtually short resistor 17 to ground on the collector side of transistor 12. Thus, the output voltage at terminal 18 undergoes the dividing action of resistors 15 and 17 and is given by the equation:

$$E_{out}=\frac{r_{17}}{r_{15}+r_{17}}E_{in} \qquad (1)$$

where $r_{15}$ is the resistance of resistor 15 and $r_{17}$ is the resistance of resistor 17.

Thus, a breaking point is obtained on the characteristic without attaching bias voltage to the real (function) forming circuitry, since the bias voltage from terminal 21 is applied to transistor 11 rather than to transistor 12.

Figure 2:
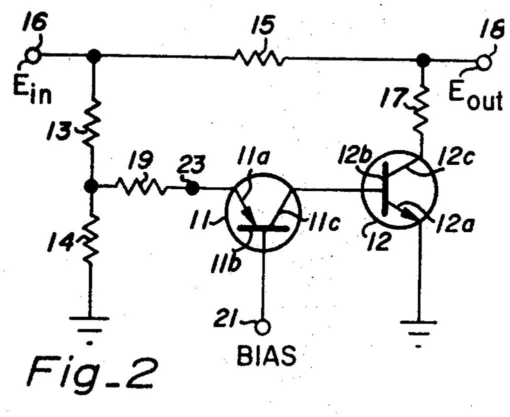
FIG. 2 is a circuit diagram illustrating the principle of the invention for modifying the output voltage when the input voltage increases above a predetermined value.

The circuit of FIG. 2 illustrates the principle of the invention where the output voltage is to be modified when the input voltage increases above a predetermined value. Resistors 13 and 14 are connected as shown between input terminal 16 and ground, while current limiting resistors 19 is connected between emitter 11*a* and the junction of resistors 13 and 14. Base 11*b* of transistor 11 is connected to bias terminal 21, while collector 11*c* and transistor 12 are connected as in the embodiment of FIG. 1.

From FIG. 2, it will be seen that when the output at the point 23 is lower than the bias from terminal 21, transistor 11 will be non-conducting and so will transistor 12. However, when the voltage at point 23 increases above the value of the bias from terminal 21, transistor 11 will conduct and trigger transistor 12 into saturation to effectively shunt resistor 17 to ground, as in the circuit of FIG. 1. It will be seen that in both of the circuits of FIGS. 1 and 2, resistor 19 in the emitter lead of transistor 11 will limit the current through both transistors in the case of saturation to thereby limit the power dissipation in the circuit.

Figure 4:
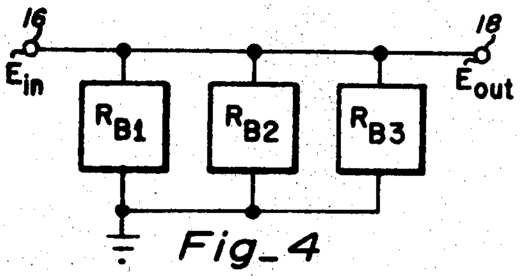
FIG. 4 is a schematic representation of the resistance blocks employed to generate the non-linear function of FIG. 3.
Figure 3:
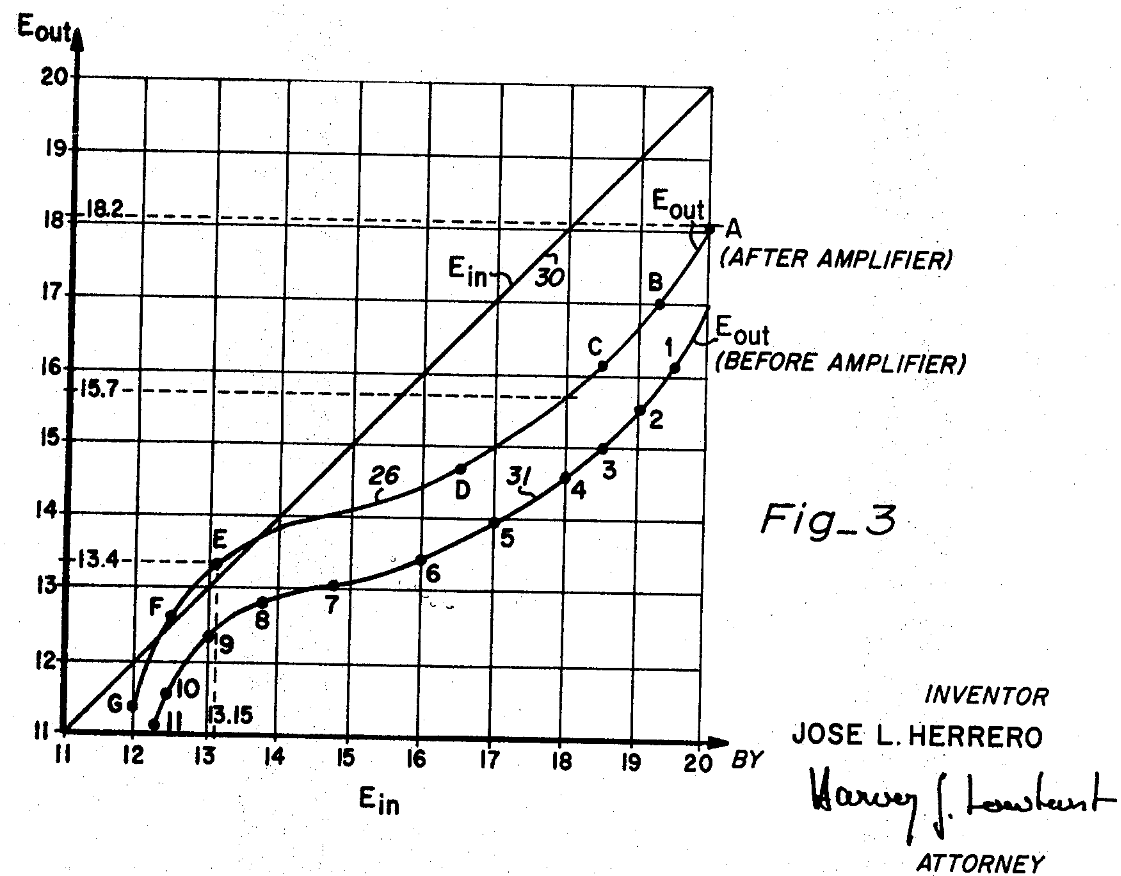
FIG. 3 contains graphs of an input voltage and a typical non-linear function which may be produced therefrom according to this invention.

The principles discussed above will now be applied to a specific function generator design to provide a better understanding of the invention. Assume that a function represented by the curve 26 of FIG. 3 is to be generated from an input signal represented by line 30. As shown, curve 26 may be described by the label ABCDEFG. Because this cuvre has three curvatures, it will be assumed that three groups of resistances are employed, as shown schematically in FIG. 4. In this figure, the block of resistance labelled $R_{B1}$ corresponds to the ABC part of curve 26, with resistances being added for decreasing values of the input voltage. Block $R_{B2}$ corresponds to the portion CDE of curve 26, with resistances being subtracted for decreasing values of the input voltage. Block $R_{B3}$ corresponds to portion EFG of curve 26, with resistances being added with decreasing values of the input voltage. The number of resistances employed in each of the blocks $R_{B1}$, $R_{B2}$ and $R_{B3}$ will depend upon the number of breaking points required to produce the desired fitting of the function.

From FIG. 3 it will be seen that the characteristic curve 26 has some gain from input to output; hence, an output amplifier will be required. To determine the amplification factor required for such an amplifier, consider the following: When the input voltage equals 20 volts, curve 26 indicates that the amplified output voltage must be 18.2 volts. Under these conditions, the equivalent circuit shown in FIG. 5 results, assuming an amplifier 28 with an amplification factor of $1/K$. The block of resistances $R_{B2}$ will be the only ones connected in the circuit at this time, since it will be recalled that the resistors of resistance blocks $R_{B1}$ and $R_{B3}$ are added for decreasing values of the input voltage.

Figure 5:
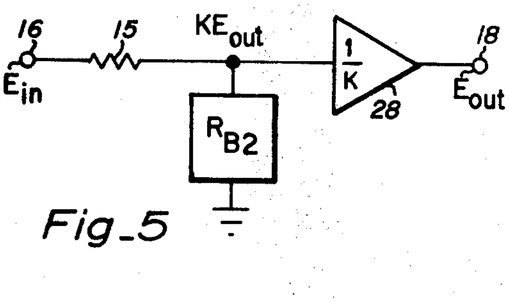
FIGS. 5, 6, 7, 8 and 9 are schematic representations of the equivalent circuits resulting from the design of a system for generating the non-linear function of FIG. 3.

From the equivalent circuit of FIG. 5, it will be seen that the following equations apply:

$$R_{B2}=\frac{K.E_{out}}{E_{in}-K.E_{out}} \text{ where } K<1 \qquad (2)$$

$$\frac{1}{R_{B2}}=\frac{20-18.2K}{18.2K} \qquad (3)$$

Figure 6:
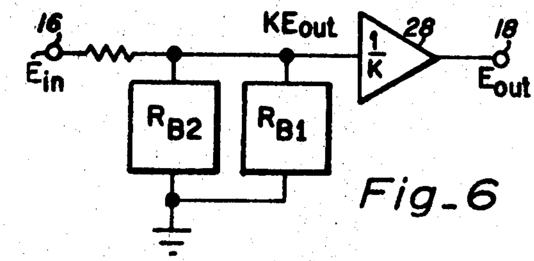

Similarly, when the input voltage is 18 volts, curve 26 indicates that the output voltage must be 15.7 volts. Under these conditions, the equivalent circuit is as shown in FIG. 6, where both resistance blocks $R_{B1}$ and $R_{B2}$ are connected. The resistance of the equivalent circuit of FIG. 6 may be expressed by the following:

$$\frac{1}{R_{B1}}+\frac{1}{R_{B2}}=\frac{E_{in}-K.E_{out}}{K.E_{out}}=\frac{18-15.7K}{15.7K} \qquad (4)$$

Figure 7:
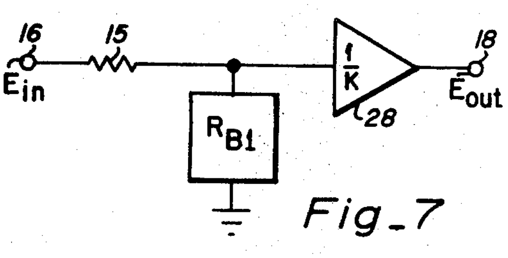

Further, when the input voltage is 13.15 volts, curve 26 indicates that the output voltage must be 13.4 volts, and the equivalent circuit is shown in FIG. 7. Only the resistance block $R_{B1}$ is involved at this point, since it will be recalled that resistance block $R_{B3}$ is employed to represent the portion EFG, which is below the level of 13.15 volts, and the resistance of resistance block $R_{B2}$ is progressively decreased to represent the portion CDE of the curve. The resistance of the equivalent circuit of FIG. 7 may be expressed as follows:

$$\frac{1}{R_{B1}}=\frac{13.15-13.4K}{13.4K} \qquad (5)$$

Since Equations 3, 4 and 5 contain only three variables, they may be solved to produce a value for K of $K=0.9337$. This value of K may then be applied graphically to curve 26 to produce the characteristic required prior to amplifier 28. This characteristic is represented in FIG. 3 by curve 31 and may be labelled with the numbered segments as shown.

The next step in the procedure is to divide curve 31 into the number of segments desired for the approximation and then compute the values of the required components. For an input voltage of 20 volts, curve 31 indicates that the output voltage must be 17 volts. From Equation 3 above, the following is true:

$$R_{B2}=\frac{17}{3}=5.667\text{K}\Omega \qquad (6)$$

Figure 8:
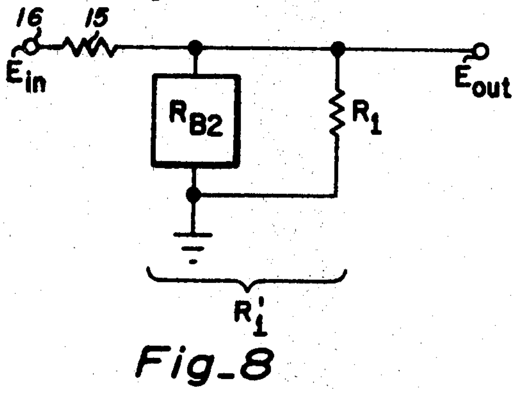

For an input voltage of 19.5 volts, curve 31 indicates that the output voltage should be 16.2 volts. The equivalent circuit for this condition is shown in FIG. 8, where the resistor $R_1$ represents the resistance to be added from resistance block $R_{B1}$ in parallel with the resistance of resistance block $R_{B2}$, which is already in the circuit. The composite resistance $R_1'$ of this network is given by:

$$R_1' = \frac{E_{out}}{E_{in} - E_{out}} = \frac{16.2}{3.3} = 4.909\Omega \quad (7)$$

Thus, $$R_1 = \frac{R_1' R_{B2}}{R_{B2} - R_1} = 36.719\text{K}\Omega \quad (8)$$

Figure 10:
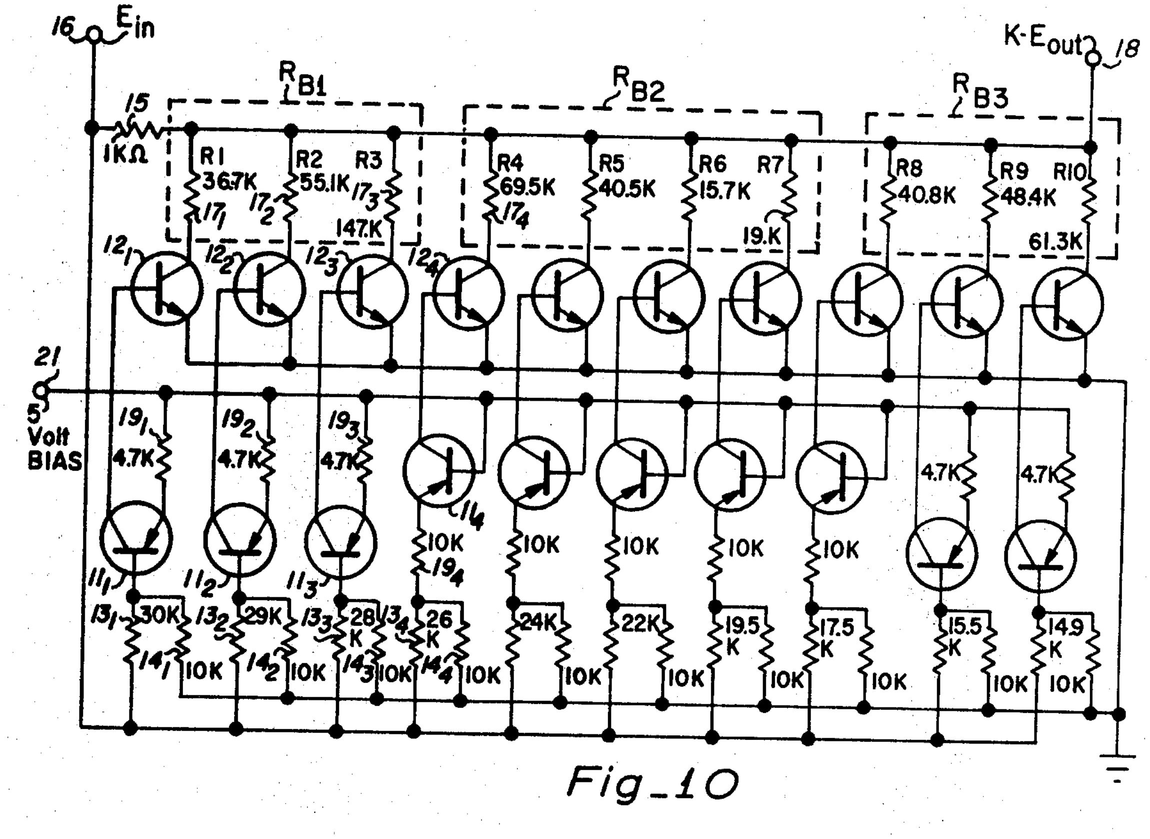
FIG. 10 is a circuit diagram of a system which may be employed to generate the non-linear function of FIG. 3.

This calculation provides the value of the first resistance $R_1$ in block $R_{B1}$ which is to be added in parallel with the resistance of block $R_{B2}$ when the input voltage decreases to 19.5 volts. This is illustrated in FIG. 10 where the resistor $R_1$ is shown as resistor $17_1$, having the resistance value of 36.7 KΩ as calculated above. It will be seen from FIG. 10 that resistor $R_1$ is connected to the collector of transistor $12_1$, which in turn is connected to transistor $11_1$ in the manner similar to that shown in FIG. 1. The circuit of FIG. 10 includes input terminal 16, resistor 15, output terminal 18, bias terminal 21, current limiting resistor $19_1$, and voltage dividing resistors $13_1$, $14_1$.

Figure 9:
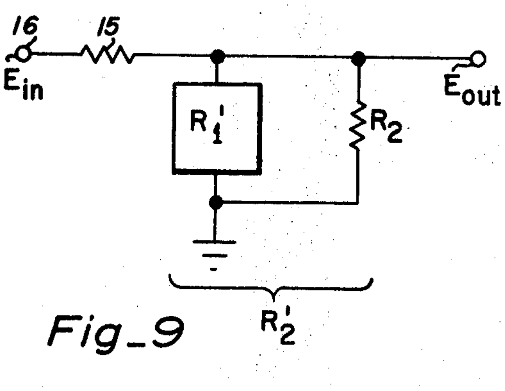

Taking the next step on the curve at an input voltage of 19 volts, curve 31 indicates that the output voltage should be 15.55 volts. The equivalent circuit for this condition is shown in FIG. 9, where the resistance $R_2'$ is the composite resistance represented by the resistance $R_1'$ of FIG. 8 and the new resistance, $R_2$, to be added.

Thus:

$$R_2' = \frac{15.55}{3.45} = 4.5\Omega \quad (9)$$

Thus, $$R_2 = 55.07\text{K}\Omega$$

This calculated value is employed for resistor $R_2$, as shown in FIG. 10, where the resistor $17_2$ represents resistance $R_2$ and is connected to transistors $11_2$ and $12_2$ as shown.

The next calculation may be made for an input voltage of 18 volts, giving an output voltage of 14.65 volts. Using calculations similar to those discussed above for the equivalent circuits of FIGS. 8 and 9 produces:

$$R_3' = 4.373\Omega \text{ and } R_3 = 146.88\text{K}\Omega \quad (10)$$

This resistance $R_3$ is shown in FIG. 10 as resistor $17_3$ and is connected to transistors $11_3$ and $12_3$. These resistances $R_1$, $R_2$ and $R_3$ complete the resistance block $R_{B1}$ in the assumed example and are shown in the dotted enclosure labelled $R_{B1}$.

At the next value of input voltage of 17 volts, the output voltage is indicated by curve 31 to be 14 volts. It will be recalled that this portion of the curve is to be produced by taking resistances away from the resistance block $R_{B2}$. From the given input and output voltage values:

$$R_4' = \frac{14}{3} = 4.667\Omega \text{ and } R_4 = 69.514\text{K}\Omega \quad (11)$$

This value is shown in FIG. 10 for the resistor $17_4$. It will be seen that the resistance $R_4$, as well as the other resistances of block $R_{B2}$, are connected to their associated transistors 11 and 12 in the manner shown in FIG. 2, where resistances are removed for decreasing values of input voltage. Similar calculations for the remaining values of resistors to be removed from resistance block $R_{B2}$ for decreasing voltages are as follows:

for $$E_{in} = 16,\ E_{out} = 13.45$$
$$R_5' = 5.2745 \text{ and } R_5 = 40.5\text{K}\Omega$$

for $$E_{in} = 14.75,\ E_{out} = 13.1$$
$$R_6' = 7.9394 \text{ and } R_6 = 15.714\text{K}\Omega$$

for $$E_{in} = 13.76,\ E_{out} = 12.83 \quad (12)$$
$$R_7' = 13.796 \text{ and } R_7 = 19.029\text{K}\Omega$$

for $$E_{in} = 13.15,\ E_{out} = 12.5$$
$$R_8' = 20.833 \text{ and } R_8 = 40.84\text{K}\Omega$$

These resistances are all labelled in FIG. 10 and shown within the dotted enclosure $R_{B2}$.

For an input voltage of 12.45 volts, the output voltage is 11.65 volts. It will be seen that this portion of the curve is to be represented by resistance block $R_{B3}$, and that resistances are to be added to this block for decreasing values of the input voltage. Hence:

for $$E_{in} = 12.45,\ E_{out} = 11.65$$
$$R_9' = 14.563 \text{ and } R_9 = 43.388\text{K}\Omega$$

for $$E_{in} - 12.25,\ E_{out} = 11.06 \quad (13)$$
$$R_{10}' = 11.766 \text{ and } R_{10} - 61.26\text{K}\Omega$$

These last two resistances are shown in the dotted enclosure $R_{B3}$ in FIG. 10. Thus, the total circuit of FIG. 10 represents a function generator in accordance with this invention having ten different breaking points assumed for the calculations of the reistances to be employed. It will be understood, however, that any desired number of breaking points may be employed in designing a given function generator, depending upon the circumstances and resolution required. Each of the circuits represented by a given resistor, such as $R_1$, together with its associated transistors 11, 12, voltage dividing resistors 13, 14 and current limiting resistor 19, may be considered to be a network for controlling the shape of a different portion of the output curve. It will be noted that the values for the different voltage dividing resistors 13, 14 in the different networks are given in FIG. 10, and it will be seen that these values vary from network to network to provide successive modification of the output curve for difference values of the input signal.

Figure 11:
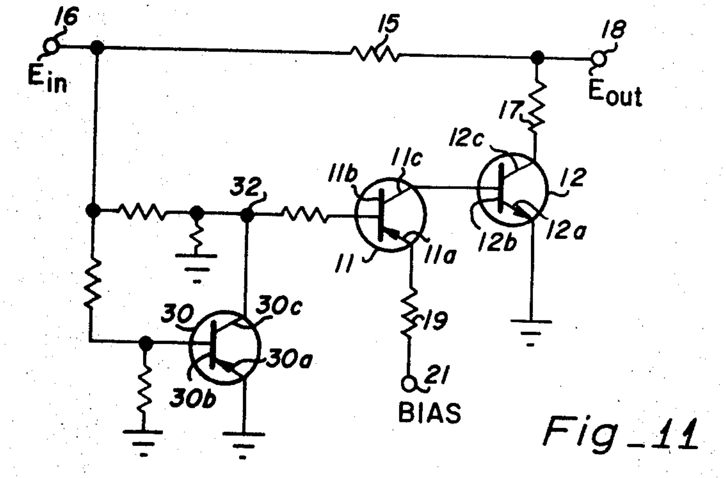
FIGS. 11 and 12 are circuit diagrams illustrating the principles of alternate embodiments of the invention for switching resistances into and out of the circuit at different voltage levels.

FIG. 11 illustrates the principle of an additional alternate embodiment of the invention for use in generating a function by triggering resistances in and out of the circuit. In this circuit, transistors 11 and 12 are connected as in the embodiment of FIG. 1 and operate to connect resistor 17 into the characteristic function generating circuit when the input voltage decreases to a predetermined value. This circuit also includes an additional transistor 30 having an emitter **30*a*, a base 30*b* and a collector 30*c*. The connections of a transistor 30 are such that it is triggered into conduction at a lower voltage than is transistor 11**.

Thus, after transistor 11 is rendered conductive at a predetermined voltage, to connect resistor 17 into the function generating circuit, transistor 30 is rendered conductive at some lower voltage level. This conduction saturates transistor 30 and brings the voltage at point 32 in the circuit to the same potential as that of the emitter **30*a* (ground in the illustrated embodiment). This action, in turn, renders transistors 11 and 12 non-conductive to thereby effectively remove resistor 17 from the function generating circuit. Thus, resistor 17 remains in the circuit for a voltage range determined by the triggering in and out of the transistors 11 and 30**.

Figure 12:
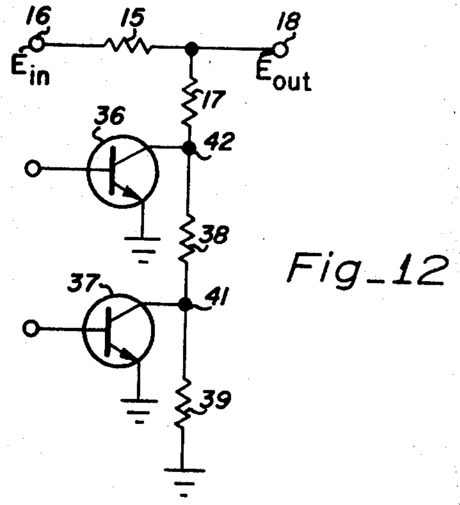

FIG. 12 illustrates the principles of an additional alternate embodiment of the invention for use in triggering resistance in steps. This embodiment includes transistors 36 and 37 which are triggered in succession at different voltage levels. From FIG. 12, it will be seen that when neither of transistors 36, 37 is conducting, the total shunted resistance is that of resistors 17, 38 and 39. When transistor 37 is rendered conductive at some voltage level, this brings the potential of its associated point 41 to ground, to thus bypass resistor 39 so that the shunted resistance is only that of resistors 17 and 38. If transistor 36 then becomes conductive at some different voltage level, this will bring the potential of point 42 to ground, thus bypassing resistors 38 and 39 and making the shunted resistance only that of resistor 17.

It will be apparent from the above description that there is provided a novel function generator which is simple in design and whose circuit components are independently acting between the breaking points selected. Additionally, the generator of this invention is capable of producing either monotonic or nonmonotonic curves or functions, and may be employed to linearize a non-linear function. Further, by using adjustable resistors in the circuitry, a variable function generator may be produced in accordance with the teachings of this invention.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention. It is the intention, therefore, to be limited only as indicated by the scope of the following claims.

What is claimed is:

1. A function generator for producing an output signal at an output terminal which is a predetermined function of an input signal appearing at an input terminal, comprising:
   - input terminal means and output terminal means;
   - impedance means coupling said input terminal means to said output terminal means;
   - a first transistor and a second transistor, each of said transistors having a base electrode, a collector electrode and an emitter electrode;
   - biasing means for impressing a biasing signal on one of the electrodes of said second transistor;
   - means for impressing a measure of an input signal applied to said input terminal means on another electrode of said second transistor in opposition to said biasing signal, whereby said second transistor is rendered conductive when said input signal bears a predetermined relationship to said biasing signal;
   - means connecting the remaining electrode of said second transistor to one electrode of said first transistor to render said first transistor conductive when said second transistor is rendered conductive and to render said first transistor non-conductive when said second transistor is non-conductive; and
   - first resistance means coupling another electrode of said first transistor to said output terminal means, the remaining electrode of said first transistor being coupled to circuit ground, said first resistance means being effectively open circuited relative to said output terminal means when said first transistor is non-conductive and being effectively connected across said output terminal means and circuit ground when said first transistor is conductive, whereby said first resistance means modifies said output signal at said output terminal means when said first transistor is rendered conductive or non-conductive.

2. Apparatus in accordance with claim 1 including a current limiting resistor connected to said one electrode of said second transistor to limit the current flow therethrough when said second transistor is conductive.

3. Apparatus in accordance with claim 1 including a plurality of networks, each of said networks comprising one of said first transistors, one of said second transistors and one of said first resistance means, said networks being connected between said input terminal means and said output terminal means; and
   - each of said networks including, as components of said means for impressing a measure of said input signal, individual voltage dividing means connected to each of said second transistors for independently controlling the measure of said input signal impressed on its associated second transistor, each of said voltage dividing means having a different value to impress different measures of said input signal on the different ones of said second transistors, whereby the different ones of said second transistors are rendered conductive and non-conductive at different values of said input signal to produce successive modifications of said output signal at said different values of said input signal.

4. Apparatus in accordance with claim 3 in which the value of said first resistance means in each of said networks is different.

5. A function generator in accordance with claim 1 in which said collector of said second transistor is connected to said base of said first transistor, and said first resistance means is connected between said output terminal means and said collector of said first transistor.

6. A function generator in accordance with claim 5 including a current limiting resistor connected to said emitter of said second transistor to limit the current flow therethrough when said second transistor is conductive.

7. A function generator in accordance with claim 5 wherein said means for impressing a measure of said input signal includes voltage dividing means connected between said input terminal means and said second transistor for controlling the measure of said input signal applied to said second transistor.

8. A function generator in accordance with claim 7 in which said voltage dividing means is connected between said input terminal means and said base of said second transistor.

9. A function generator in accordance with claim 7 in which said voltage dividing means is connected between said input terminal means and said emitter of said second transistor.

10. A function generator in accordance with claim 7 including a current limiting resistor connected to said emitter of said second transistor to limit the current flow therethrough when said second transistor is conductive.

References Cited

UNITED STATES PATENTS

| | | | |
|---|---|---|---|
| 3,428,746 | 2/1969 | Graf | 328—169 X |
| 3,097,309 | 7/1963 | Pearlman | 307—229 |
| 3,319,086 | 5/1967 | Yee | 307—230 X |
| 3,327,058 | 6/1967 | Coker | 307—230 X |

FOREIGN PATENTS

| | | |
|---|---|---|
| 573,530 | 4/1959 | Canada. |

STANLEY D. MILLER, Jr., Primary Examiner

U.S. Cl. X.R.

307—230, 237; 328—142; 330—29, 151